United States Patent [19]

Vehmas et al.

[11] Patent Number: 5,501,717
[45] Date of Patent: Mar. 26, 1996

[54] METHOD AND FURNACE APPARATUS FOR BENDING AND TEMPERING A GLASS SHEET SUPPORTED ON A RING MOULD

[75] Inventors: Jukka Vehmas; Juha Paavola, both of Tampere, Finland

[73] Assignee: Tamglass Engineering Oy, Tampere, Finland

[21] Appl. No.: 223,023

[22] Filed: Apr. 5, 1994

[30] Foreign Application Priority Data

Apr. 23, 1993 [FI] Finland .................................. 931828

[51] Int. Cl.⁶ .......................... C03B 23/023; C03B 27/04
[52] U.S. Cl. ........................... 65/104; 65/107; 65/29.14; 65/29.19; 65/162; 65/163; 65/268; 65/273
[58] Field of Search ............................ 65/107, 163, 162, 65/268, 273, 29.14, 29.19, 104

[56] References Cited

U.S. PATENT DOCUMENTS 5,306,324  4/1994  Vehmas et al. ............................ 65/104

Primary Examiner—David L. Lacey
Assistant Examiner—Steven P. Griffin
Attorney, Agent, or Firm—Burns, Doane, Swecker & Mathis

[57] ABSTRACT

The invention relates to a method and furnace apparatus for bending and tempering glass sheets. A glass sheet is supported on the same outline mold throughout the entire handling process. A bending furnace (10) is designed to be sufficiently long in the traveling direction for carrying a partially bent glass sheet towards a tempering section (16) in such a manner that the glass sheet reaches its final shape during the passage occurring within the bending furnace (10). For this purpose, the glass sheet is heated in the bending furnace (10) with such a high effect that it reaches its tempering temperature before reaching its final shape. The movements and heating of glass sheets are controlled individually on the basis of the thickness and measured temperature of each glass sheet.

16 Claims, 1 Drawing Sheet

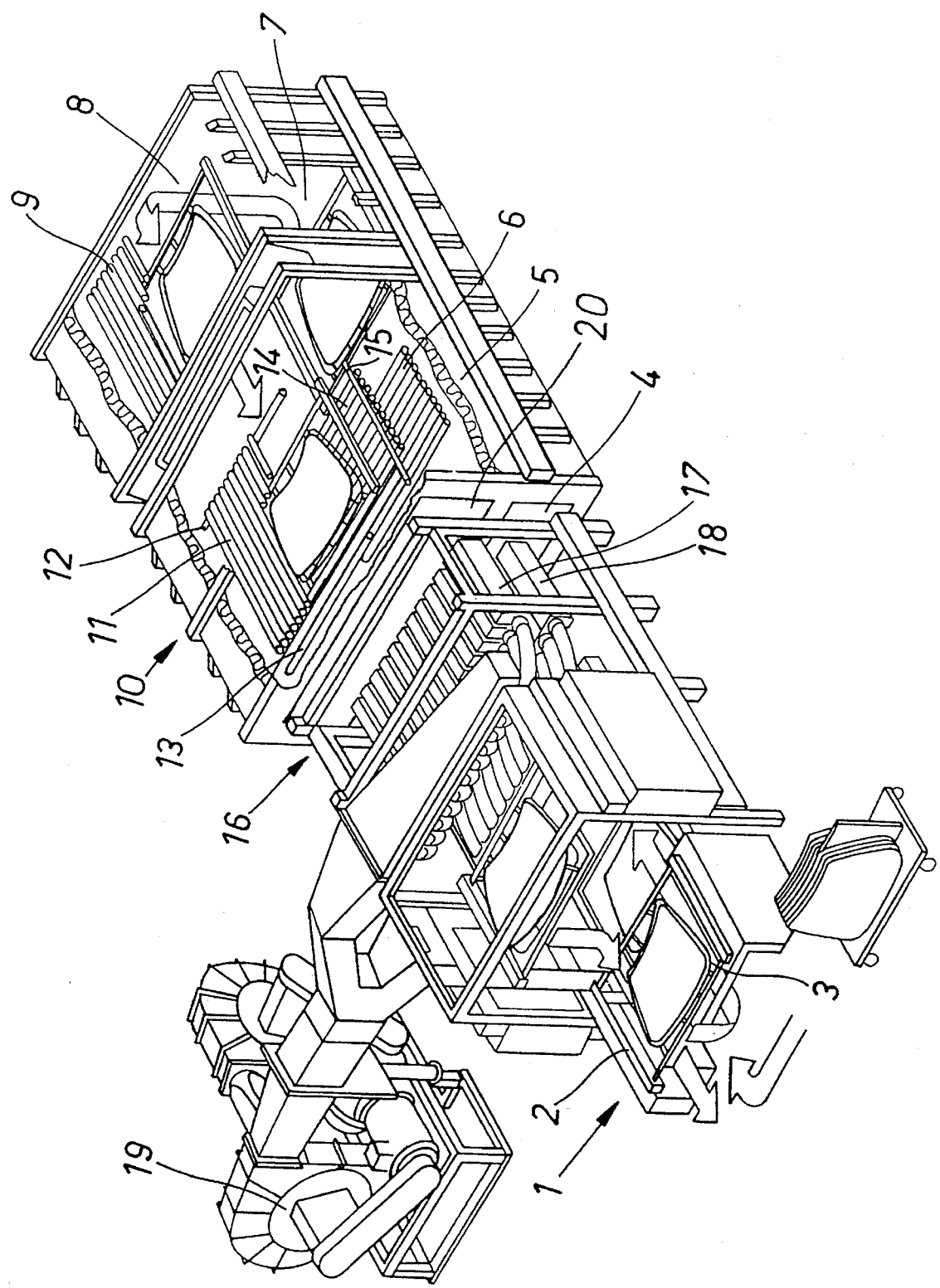

METHOD AND FURNACE APPARATUS FOR BENDING AND TEMPERING A GLASS SHEET SUPPORTED ON A RING MOULD

BACKGROUND AND SUMMARY OF THE INVENTION

The present invention relates to a method for bending and tempering glass sheets supported on a ring mould, in which method a cold glass sheet is placed on a ring mould, the ring mould along with its glass sheet is carried through at least one preheating section into a bending furnace, the preheated glass sheet is heated in the bending furnace to a bending and tempering temperature, and the bent glass sheet is carried into a tempering section, wherein chilling air is blown to its opposite surfaces.

The invention relates also to a furnace apparatus for bending and tempering glass sheets, said apparatus comprising a loading and unloading station, a plurality of outline moulds provided with carrier wagons therefor, a separate bending furnace and a separate tempering section provided with nozzles for blowing chilling air to the opposite surfaces of a bent glass sheet.

The invention is particularly suitable for bending relatively simple glass shapes that can be bent by the gravitational use of an outline mould. Many of the automotive side windows and backlights are such relatively simple shapes that can be bent by the application of a method and apparatus of the invention. There is a prior known method for essentially the same purpose, wherein a homothermal glass is dropped onto an outline mould and the glass assumes its proper shape by virtue of the inertial force and and configuration of the outline mould. This prior known method offers benefits such as high capacity and operational reliability but it also involves drawbacks, such as expensive price, a rather long shape replacement time (4–5 h), the marks caused by dropping on the edge areas of a glass, and the high price of tools for each particular glass.

On the other hand, there are prior known single furnaces operating on the outline mould principle, wherein the glass is only heated from above and the glass bends to its shape whose bending or flexural depth is determined by adjusting the heating time. The advantage offered by single furnaces is simplicity and a low price but the notable drawbacks include low capacity, a relatively large minimum thickness (typically 5 mm, sometimes 4 mm), simple bending shapes and only a moderate bending accuracy (as the bending depth is only controlled by means of bending time).

An object of the invention is to provide an improved method and furnace apparatus having a favourable price and a compact size in relation to capacity as well as low mould-related costs, facilitating also the bending of glass sheets of varying thicknesses as well as thin glass sheets.

This object is achieved by the invention on the basis of the characterizing features set forth.

Flexible production and a simple replacement of glass shapes are achieved by the invention especially by arranging the movements and heating of each glass sheet individually according to the thickness and measured temperature of the glass sheet. The key factor in providing this individual passage system is a sufficient length for a bending furnace for facilitating the commencement of the passage of glass sheets in an accelerating motion towards the tempering section and a relatively long accelerating motion in the bending furnace even prior to reaching a final bending shape. When the glass sheet reaches a predetermined tempering temperature, which is higher, the thinner a glass sheet in question, the passage motion is instigated in the furnace, the glass sheet reaching its final shape during the passage and, at the same time, the glass sheet reaches a sufficiently high traveling speed in view of advancing from the furnace into the tempering section in a time as short as possible.

This differs essentially from the prior known furnace assemblies, wherein the passage from the bending furnace to the tempering section is started when the leading edge of a glass sheet is as close to the discharge opening of the bending furnace as possible, so that the deformation between the commencement of passage and the tempering would be as slight as possible.

The glass sheet is supported on the same outline mould throughout the handling process. Loading and unloading are effected at the same station, whereby the glass sheets proceeding from loading to preheating are forced to travel below the tempering section. Preheating sections are located on two levels and, thus, at least one preheating section is located below the bending furnace.

BRIEF DESCRIPTION OF THE DRAWING FIGURE

One exemplary embodiment of the invention will now be described in more detail with reference made to the accompanying drawing, which shows a bending furnace of the invention in a perspective view.

DETAILED DESCRIPTION

A glass sheet to be bent is placed in a cold state upon an outline mould 3 at a combined loading and unloading station 1. The outline mould 3 is carried on a wagon 2 along a lower horizontal track extending below a tempering section 16 through an opening 4 into a preheating section 5. The opening 4 can be closed and opened by means of a cover, not shown. The preheating section 5 is provided with resistances 6 for heating a glass sheet at least from above with radiation heat. This preheating section 5 is substantially shorter than a bending furnace of the apparatus, as further described below. From the preheating section 6 said wagon 2, along with its mould 3 and glass sheet, is advanced into a space 7 below a second preheating section 8 and lifted with a hoist into the preheating section 8 provided with resistances 9 for continued heating. As prior known, the preheating can be performed quite rapidly since heat transfers effectively to cold glass. In preheating, the glass sheet typically reaches a temperature of about 500° C. Naturally, the final temperature of preheating may vary considerably one way or the other.

The preheated glass is carried on the outline mould 3 into a bending furnace 10 which simultaneously serves as an effective heating chamber having a temperature typically within the range of 800°–1000° C. The bending furnace 10 is provided with effective resistances 11, 12, 13 for heating a glass sheet so rapidly that it reaches a tempering temperature before its final shape. For example, the 4 mm glass heats from 500° C. in about 15–20 seconds to a tempering temperature of 600°–630° C., typically 615°–620° C. During this rapid heating, the glass is also allowed to bend or sag. A pyrometer is used for monitoring the temperature of heating and bending glass. Upon reaching a predetermined temperature, which substantially corresponds to the tempering temperature or is close to it or a predetermined degree of bending, the passage of a glass sheet is commenced at an accelerating speed towards a tempering section 16 before the glass sheet has bent to its final shape. Thus, the bending to a final shape occurs during the course of a relatively long horizontal passage within the boundaries of the resistance field in the bending furnace 10.

In order to be able to carry out the above procedure, the bending furnace 10 as well as the assembly of resistance fields above and below a glass sheet are made longer than usual in the traveling direction of a glass sheet. In a preferred embodiment, the bending furnace 10 has a length which is about 1.5 times the length of either of the preheating sections 5 and 8. Accordingly, the upper resistance field 11, 12, 13 and lower resistance field 14, 15 in the bending furnace 10 have a length in the traveling direction of a glass sheet which is about 1.5 times the length of resistance fields 6 and 9. Also the resistance fields 6 and 9 have a length which clearly exceeds the length of a typical glass sheet (e.g. an automotive rear window) in its traveling direction. In the bending furnace 10, the resistance fields have a length which is more than twice the height of a typical automotive rear window. This makes it possible that a glass sheet is capable of traveling within the furnace 10 between the upper and lower resistance fields a distance corresponding to at least the dimension of the glass sheet in the traveling direction. In other words, the passage towards the tempering section is commenced at a point when the leading edge of a glass sheet is a distance away from a discharge opening 20 included in the bending furnace 10, said distance being at least equal to the height of a glass sheet, i.e. its dimension in the traveling direction. In view of the fact that a soft glass sheet supported on an outline mould can only be subjected to a certain limited acceleration, the glass sheet can be given a traveling speed of about 1 m/s (at least about 0.8 m/s) before the leading edge of a glass sheet leaves the bending furnace 10. The passage of a partially bent glass sheet can be commenced at that end of furnace 10, which is furthest away from the tempering section 16, or also in the middle of said furnace 10 with the glass sheet moving first backwards and then commencing an accelerating motion towards the tempering section 16. The former alternative is the simplest in view of operation control as a glass sheet arriving from preheating section 8 in bending furnace 10 stops in the inlet end of furnace 10 as soon as it is entirely between the resistance fields.

The heat distribution in furnace 10 is controlled by the disposition of resistances. Thus, it is preferable that the upper resistance field be provided with resistances 11 extending in the traveling direction substantially over the entire length of the furnace. The end sections of resistances 11 are further provided with crosswise resistances 12 and 13 for preventing too sharp a decline of heating effect at the ends of the resistance field. The lower resistance field of furnace 10 comprises crosswise resistances 14, which cover substantially the entire heating field area of the furnace and whose ends are provided with longitudinal resistances 15.

Predetermined resistances included in the resistance fields 11, 12, 13 and 14, 15 of bending furnace 10 include means to switch on at a certain time before a glass sheet arrives in the bending furnace 10. Predetermined resistances include means to switch off as a glass sheet leaves the bending furnace. During the intermission while the furnace is empty, the only resistances maintained switched on are those required for keeping the temperature of an unloaded bending furnace 10 substantially stable. The object of this arrangement is that, although the glass sheets are manipulated and heated as individuals, it is possible to maintain a stable and reproducible environment in the furnace, i.e. the effect of the inertial mass delay of the resistances will be eliminated.

As prior known, the thinner a glass in question, the higher a tempering temperature is required. Accordingly, the furnace must be hotter. Thus, the ideal temperature in the furnace must be found individually for each glass thickness. This also requires the use of such an operation control that each glass sheet travels as an individual, i.e. the movements of glass sheets are temporally and locally independent of each other. The operating cycle is typically about 1 minute or the furnace produces approximately 60 bent and tempered glass sheets per hour. The number can be less, e.g. 40 sheets/h, if an unloaded wagon is run after every two glass sheets for equalizing the temperature. The dwelling time of a thin glass sheet in the bending furnace 10 is typically only about 10–15 seconds. During the interval, the bending furnace 10 is empty. The required resistances in the resistance fields of furnace 10 are switched on e.g. about 10 seconds before another glass sheet arrives in the empty furnace.

In order not to become overheated in furnace 10, a glass sheet must be transferred as quickly as possible to tempering. This is assisted by the above-described accelerating motion in furnace 10 during the final bending of a glass sheet. The transfer from bending to tempering can be further sped up by timing the approaching action of nozzle boxes 17 and 18 in the tempering section 16 to commence as soon as the leading edge of a glass sheet has passed the lowest point located in the mid-section of the nozzle boxes. Thus, the question is about nozzle boxes conforming to the bent outline of a glass sheet, said nozzles being capable of blasting from a position sufficiently close to a glass sheet. When a glass sheet stops between nozzle boxes 17 and 18, the latter have already drawn near the final position thereof. Fans 19 supply chilling air to the nozzle boxes 17 and 18.

As soon as the tempering is concluded, said nozzle boxes 17 and 18 are drawn away from each other for carrying the glass sheet to a location alongside and above the loading and unloading station 1. When the loading and unloading station is empty, the bent and tempered glass sheet can be lowered down on the lower track level for carrying it into said loading and unloading station 1. The bent and tempered glass sheet is removed from mould 3 and it is replaced with a flat, cold glass sheet which is carried below tempering section 16 into preheating section 5.

Thus, the glass sheets are supported on the same outline mould throughout the entire handling process. This simplifies substantially the construction and operation of the apparatus as compared to cases, wherein the glass sheet must be transferred from one supporting bed onto another. Operation of the furnace apparatus can be completely automated and the operator is only required to input information about the thickness of any given glass sheet to be bent.

We claim:

1. A method for bending and tempering glass sheets supported on a ring mould, comprising:

placing a glass sheet on a ring mould, conveying the ring mould with the glass sheet through at least one preheating section to preheat the glass sheet, conveying the ring mould and preheated glass sheet into a bending furnace between upper and lower resistance fields, further heating the preheated glass sheet in the bending furnace to a bending and tempering temperature and allowing the glass sheet to bend, and conveying the glass sheet from the bending furnace into a tempering section where a tempering step is performed by blowing chilling air to opposite surfaces of the glass sheet, wherein the step of conveying the glass sheet in the bending furnace into the tempering section includes measuring at least one of a temperature of the glass sheet and a degree of bending of the glass sheet, and accelerating the glass sheet toward the tempering section when at least one of the temperature and degree of bending of the glass sheet reaches a predetermined amount, wherein a leading edge of the glass sheet travels a distance through the bending furnace to a discharge opening of the bending furnace at least equal to a dimension of the glass sheet aligned in a conveying direction of the glass sheet in the bending furnace, wherein the glass sheet reaches a final shape in the bending furnace at the discharge opening.

2. A method as set forth in claim 1, wherein the distance the glass sheet is conveyed through the bending furnace, before the leading edge of the glass sheet leaves the bending furnace, is at least 1.5 times the dimension of the glass sheet in the conveying direction of the glass sheet and that a conveying speed of the glass sheet through the bending furnace is increased until the glass sheet has partially left the bending furnace.

3. A method as set forth in claim 1, wherein:

the step of placing the glass sheet on the ring mould occurs at a loading and unloading station, and wherein the step of conveying the ring mould and glass sheet through the at least one preheating section occurs on a level located below the tempering section and the bending furnace, and wherein after the tempering step, the glass sheet is unloaded from the ring mould at the loading and unloading station, the glass sheet being supported on the same ring mould throughout all the steps of the method from loading to unloading.

4. A method as set forth in claim 1, wherein a temperature of the bending furnace is adjusted according to a thickness of the glass sheet, the temperature of the bending furnace being inversely proportional to the thickness of the glass sheet.

5. A method as set forth in claim 1, wherein the conveying and heating of the glass sheet in the bending furnace are controlled on the basis of a thickness and measured temperature of the glass sheet.

6. A method for bending and tempering glass sheets supported on a ring mould, comprising:

placing a glass sheet on a ring mould, conveying the ring mould with the glass sheet through at least one preheating section to preheat the glass sheet, conveying the ring mould and preheated glass sheet into a bending furnace, further heating the preheated glass sheet in the bending furnace to a bending and tempering temperature and conveying the glass sheet within the bending furnace, wherein a temperature of the bending furnace is adjusted for the glass sheet according to a thickness of the glass sheet, said adjusted bending furnace temperature being inversely proportional to the thickness of the glass sheet, measuring a temperature of the glass sheet during heating in the bending furnace, and conveying the glass sheet into a tempering section where chilling air is blown to opposite surfaces of the glass sheet to temper the glass sheet, wherein the glass sheet is heated in the bending furnace at a rate sufficient to heat the glass sheet to a tempering temperature before reaching a final shape and wherein the glass sheet is conveyed in the bending furnace toward the tempering section when the glass sheet reaches a predetermined temperature which is at least near a tempering temperature, wherein the bending of the glass sheet to a final shape occurs during the conveying of the glass sheet within the bending furnace.

7. A method as set forth in claim 6, wherein a distance the glass sheet is conveyed in the bending furnace, before a leading edge of the glass sheet leaves the bending furnace, is at least 1.5 times a dimension of the glass sheet in a conveying direction of the glass sheet in the bending furnace and that a conveying speed of the glass sheet in the bending furnace is increased until the glass sheet has partially left the bending furnace.

8. A method as set forth in claim 6, wherein:

the step of placing the glass sheet on a ring mould occurs at a loading and unloading station, the step of conveying the glass sheet through the at least one preheating section occurs on a level located below the bending furnace, and wherein, after the tempering step the glass sheet is unloaded from the ring mould at the loading and unloading station, the glass sheet being supported on the same ring mould throughout an entire handling process from loading to unloading.

9. A furnace apparatus for bending and tempering glass sheets, said apparatus comprising:

a loading and unloading station, a plurality of outline moulds including carrier wagons, at least one preheating section, a separate bending furnace a separate tempering section provided with nozzles for blasting chilling air to opposite surfaces of a bent glass sheet, and means for conveying a glass sheet on one of said outline moulds through the furnace apparatus, wherein the bending furnace includes a resistance field having a length in a traveling direction of the glass sheet through the bending furnace of at least 1.5 times a dimension of the at least one preheating section in the traveling direction and wherein the bending furnace and tempering section are located on a single horizontal level, wherein the glass sheet on said outline mould is movable on the horizontal level within boundaries of the resistance field toward the tempering section.

10. An apparatus as set forth in claim 9, wherein said means for conveying the glass sheet is operable to convey the glass sheet in the bending furnace in an accelerating motion so that the glass sheet reaches a traveling speed of at least 0.8 m/s before a leading edge of the glass sheet leaves the bending furnace.

11. An apparatus as set forth in claim 9, wherein the at least one preheating section is located below the bending furnace and wherein a passageway from the loading and unloading station to the at least one preheating section is located below the tempering section.

12. An apparatus as set forth in claim 9, further comprising means for switching on predetermined resistances in the resistance field of the bending furnace at a predetermined moment before the glass sheet enters the bending furnace and to switch off predetermined resistances when the glass sheet leaves the bending furnace, wherein during an interval when the bending furnace is empty, only resistances sufficient for maintaining a stable temperature in the empty bending furnace are in a switched on state.

13. An apparatus as set forth in claim 9, wherein the resistance field is disposed as an upper resistance field which includes upper resistances having a longitudinal direction aligned with the traveling direction of the glass sheet through the bending furnace, and the bending furnace further comprising a lower resistance field which includes lower resistances having a longitudinal direction transverse to the longitudinal direction of the upper resistance field.

14. An apparatus as set forth in claim 13, wherein ends of the resistances included in said upper and lower resistance fields each include additional resistances which are positioned transverse relative to the respective upper and lower resistances.

15. A furnace apparatus for bending and tempering glass sheets, said apparatus comprising:

a loading and unloading station, a plurality of outline moulds including carrier wagons, at least one preheating section, a separate bending furnace and a separate tempering section provided with nozzles for blasting chilling air to opposite surfaces of a bent glass sheet, wherein the at least one preheating section is located below the bending furnace, the at least one preheating section having a length in a traveling direction of a glass sheet substantially shorter than a length of the bending furnace, and wherein a passageway between the loading and unloading station and said at least one preheating section extends below the tempering section, and wherein one outline mould supports the glass sheet throughout an entire handling process through the furnace apparatus.

16. An apparatus as set forth in claim 15, further comprising means for conveying the glass sheet in the bending furnace at an accelerating speed toward the tempering section while the glass sheet is bending, a traveling distance and acceleration of the glass sheet in the bending furnace being selected so that the glass sheet reaches a speed of a least 0.8 m/s before a leading edge of the glass sheet leaves the bending furnace.

* * * * *